March 15, 1938.  T. L. HEDGPETH  2,111,067
CHUCK FOR WOODWORKING TOOLS
Original Filed May 2, 1935

Inventor:
Theron L. Hedgpath
By Williams, Bradbury, McCaleb & Hinkle
Attys.

Patented Mar. 15, 1938

2,111,067

UNITED STATES PATENT OFFICE 2,111,067

CHUCK FOR WOODWORKING TOOLS

Theron L. Hedgpeth, Oak Park, Ill., assignor to Duro Metal Products Company, Chicago, Ill., a corporation of Illinois Original application May 2, 1935, Serial No. 19,335. Divided and this application December 31, 1936, Serial No. 118,427

2 Claims. (Cl. 287—107)

The present invention relates to chucks for wood working tools, particularly of the type termed "shapers". Some of the features of the invention, however, are of universal application to other types of tools and I do not wish to be limited in the application of my invention except as set forth in the appended claims.

This application is a division of my prior application Serial No. 19,335 filed May 2, 1935 for Wood working tools, which has resulted in the issuance of Patent No. 2,076,511, dated April 6, 1937.

One of the objects of the invention is the provision of an improved chuck for wood working tools, which is adapted to align accurately the axis of the rotating cutter with the axis of the drive shaft.

Another object of the invention is the provision of an improved chuck for wood working tools having a cutter which is positive in its securement, accurate in its alignment, and speedy in its application whereby a tool of one size may be quickly removed and that of another size quickly installed.

Another object of the invention is the provision of an improved chuck structure which is capable of economical manufacture so that it may be applied to wood working tools which can be sold at a low cost and thus placed within the reach of a larger number of users.

Other objects and advantages of the invention will be apparent from the following description and the accompanying drawing, in which similar characters of reference indicate similar parts throughout the several views.

Figure 1:
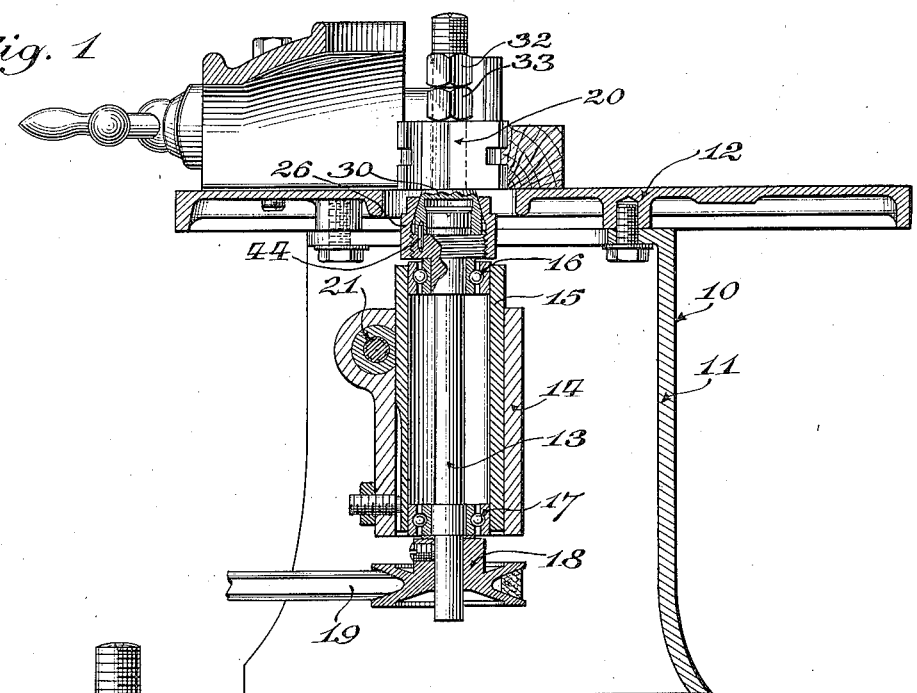
Figure 2:
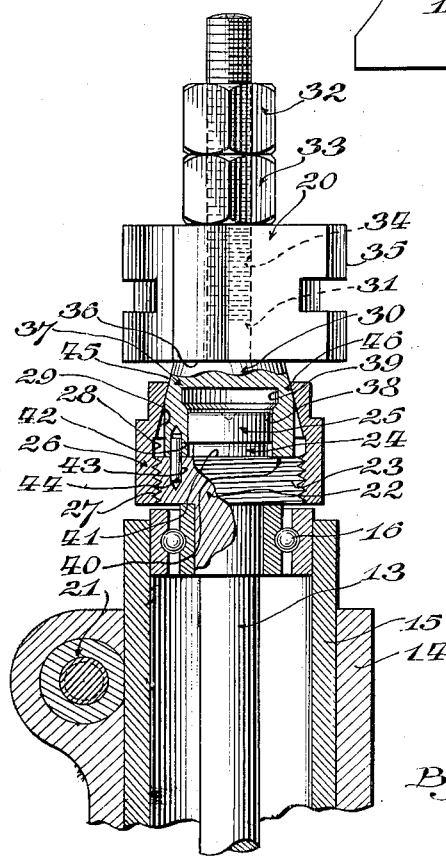

Referring to the single sheet of drawings accompanying this specification:

Fig. 1 is a vertical sectional view taken through a shaper on a vertical plane, passing through the axis of the vertical drive shaft showing the application of the invention to a wood working tool, and Fig. 2 is a fragmentary elevational view showing the upper end of a drive shaft and the details of construction of the present chuck.

Referring to Fig. 1, 10 indicates in its entirety the shaper to which the invention has been applied, comprising a base 11, a table 12 secured thereto and suitable means for supporting the rotating cutter shaft 13 as follows. The base 11 carries a sleeve 14 having another sleeve 15 slidably mounted therein and rotatably supporting the shaft 13 by the ball bearings 16, 17. The shaft is driven by means of a pulley 18 and belt 19. By means of a suitable arrangement (not shown) the sleeve 15 and with it the shaft 13 and cutter 20 may be moved to any of a plurality of predetermined elevations and clamped by means of a member 21.

The shaft 13 (Fig. 2) is provided with a suitable head 22 consisting of an enlarged cylindrical portion provided with threads 23. The head 22 has an axially projecting cylindrical portion 24 of reduced size and above that, in Fig. 2, an aligning cylindrical portion 25 of slightly larger size. The portion 25 is accurately ground to cylindrical form and accurately located in axial position with respect to the axis of shaft 13 as its function is that of effecting an axial alignment of the cutter 20. The purpose of the reduced cylindrical portion 24 is that by the removal of this material at the reduced portion 24 it is assured that there will be no fillet in the corner between the head and the cylindrical portion 25 which might interfere with the aligning function of the cylindrical portion 25.

The head 22 is provided with a threaded chuck sleeve 26 which has a threaded bore 27 adapted to receive the threaded head 22. The chuck sleeve 26 has a bore 28 communicating with and forming an extension of the threaded bore 27. The sleeve is also provided with a tapered bore or frusto conical surface 29 for engaging a cutter holder 30. The cutter holder 30 comprises a substantially cylindrical rod 31 which is threaded at its upper end to receive the nut and lock nut 32, 33 which secure the cutter 20 in place. Various types and shapes of cutters may be employed, all of which are provided with an axially extending bore 34 for receiving the rod 31 and with suitably shaped cutting edges 35.

The cutter holder 30 is provided with a flat annular surface 36 at the lower end of the rod 31 and the upper end of a head 37. The cutter 20 is secured by being clamped between the nut 33 and the annular surface 36. The head 37 of the cutter holder is provided with an accurately machined and axially located cylindrical bore 38 which has a close sliding fit on the cylindrical portion 25 of the shaft. The head 37 is preferably undercut at 39 so as to assure lack of interference between any other part inside the bore 38 and the cylindrical part 25. Thus, the cutter holder 30 is lined up with the shaft 13 by the interengagement of the cylindrical surfaces 25 and 38. The lower end 40 of the cutter holder lies against a flat annular shoulder 41 on the head 22.

In order to assure the fixity of the cutter holder with respect to rotation on the shaft 13, the holder 30 may be provided with a bore 42 and the shaft 13 may be provided with a bore 43. A pin 44, which has a drive fit in bore 43, slides into the bore 42 when the cutter holder is secured in the chuck. This prevents rotation between the cutter holder and the shaft.

The cutter holder is provided with an external frusto conical surface 45 of such size that its largest portion will not pass the aperture 46 in the end of the sleeve 26. The sleeve 26 may then be threaded on the threaded head 22 to draw the cutter holder 30 flatly against the annular surface 41. The alignment of the cutter holder with the shaft, however, is not determined by the location of the sleeve 26 which might be out of axial alignment due to the cutting of the threads 23. Threads are frequently cut in such manner that the cutter may shift to one side or the other, dependent upon the softness of the material and thus the threads may not be axially located with respect to the shaft 13.

It will thus be observed that I have invented an improved chuck for wood working tools which is adapted to be used for securing cutters of various sizes on the drive shaft. The tool is usually provided with a number of cutter holders 45 having tool supporting shafts or rods 31 of different size, as the larger cutters may require a larger holder. These holders may be removed very quickly by merely turning the sleeve 26 until it has been removed from the threads 23, and another larger or smaller holder may be substituted. The present chuck assures an accurate alignment of the cutter holder with the drive shaft. A holder may be employed, if desired, for every different cutter, thereby facilitating the changing of cutters in a shorter period of time.

While I have thus illustrated and described a preferred embodiment of my invention, many modifications may be made without departing from the spirit of the invention, and I do not wish to be limited to the precise details set forth, but desire to avail myself of all changes within the scope of the appended claims.

Having thus described my invention, what I claim as new and desire to secure by Letters Pattent of the United States is:

1. A chuck for wood working tools, comprising a drive shaft with an enlarged cylindrical threaded head, said head having a flat annular surface at right angles to the axis of said shaft and an axially located reduced cylindrical portion, a threaded chuck sleeve adapted to be threadedly engaged with and disengaged from said enlarged threaded head of the drive shaft and having an inner frusto-conical surface spaced and tapered away from said threads, and a driven shaft with a hollow headed portion adapted to receive the said reduced cylindrical portion of the drive shaft, having a flat end surface at right angles to the axis of the driven shaft adapted to rest on said flat annular surface of said threaded head of the drive shaft, said hollow headed portion of the driven shaft having an exterior frusto-conical surface complementary to the frusto-conical surface on said chuck sleeve, whereby the flat end surface of the hollow headed driven shaft will engage true with the flat annular surface of the threaded head on the drive shaft when said complementary frusto-conical surfaces are wedged together by the forward threading of said chuck sleeve onto the threaded head of the drive shaft for true alignment of the respective driven and drive shafts.

2. A chuck for wood working tools, comprising a drive shaft with an enlarged cylindrical threaded head, said head having a flat annular surface at right angles to the axis of said shaft and an axially located reduced cylindrical portion, a threaded chuck sleeve adapted to be threadedly engaged with and disengaged from said enlarged threaded head of the drive shaft and having an inner frusto-conical surface spaced and tapered away from said threads, a driven shaft with a hollow headed portion adapted to receive the said reduced cylindrical portion of the drive shaft having a flat end surface at right angles to the axis of the driven shaft adapted to rest on said flat annular surface of the threaded head of said drive shaft, said hollow headed portion of the driven shaft having an exterior frusto-conical surface complementary to the frusto-conical surface on said chuck sleeve, and a vertically extending pin seated in the enlarged threaded head of the drive shaft projecting upwardly from the flat surface thereof into an aligned opening in the flat end surface of the hollow head member on the driven shaft to prevent relative rotation of the said shafts in connection.

THERON L. HEDGPETH.